June 24, 1930.  R. A. KING  1,767,931
MACHINE FOR WINDING COIL SPRINGS
Filed June 22, 1929   6 Sheets-Sheet 1

INVENTOR
Randall A. King,

ATTORNEY

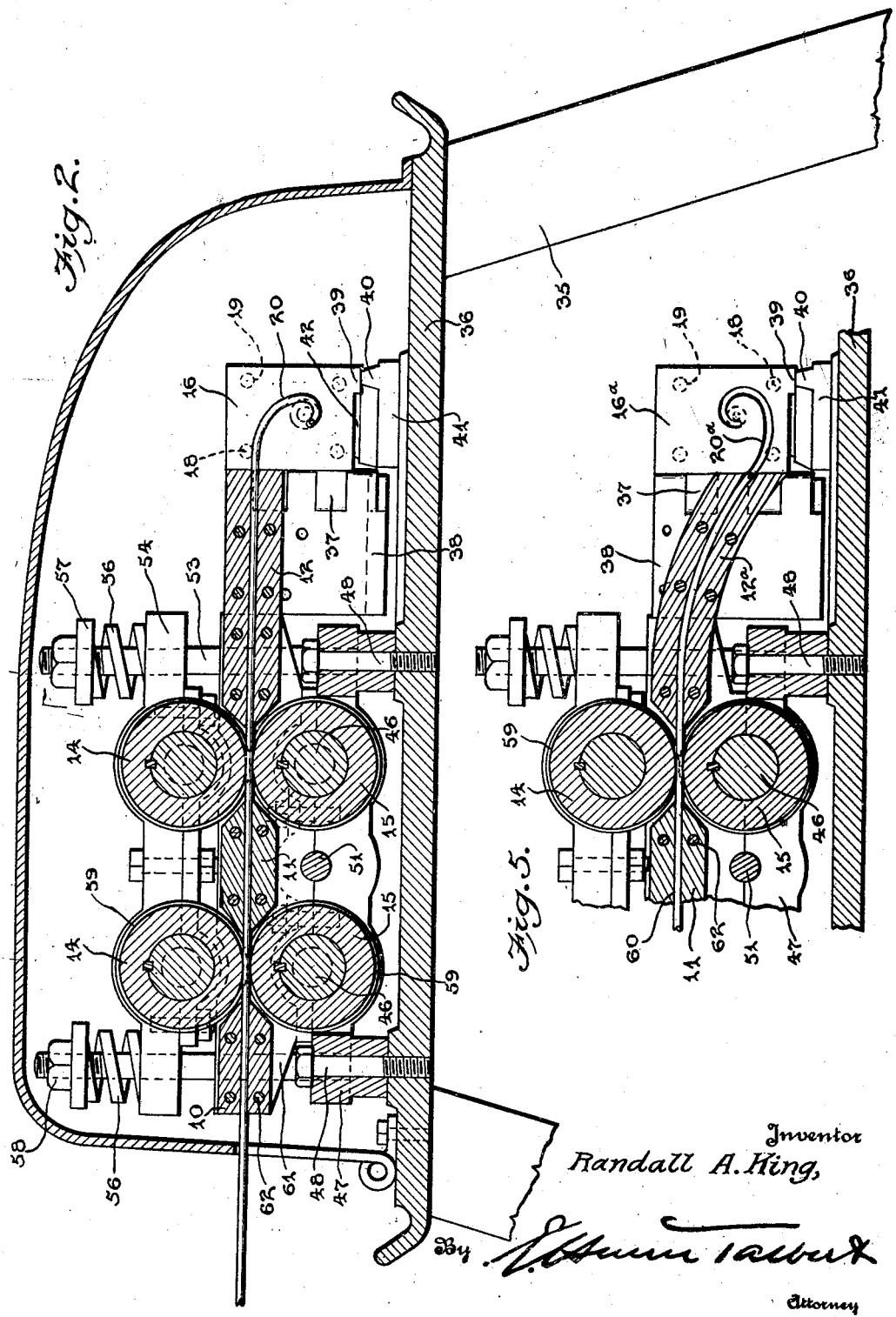

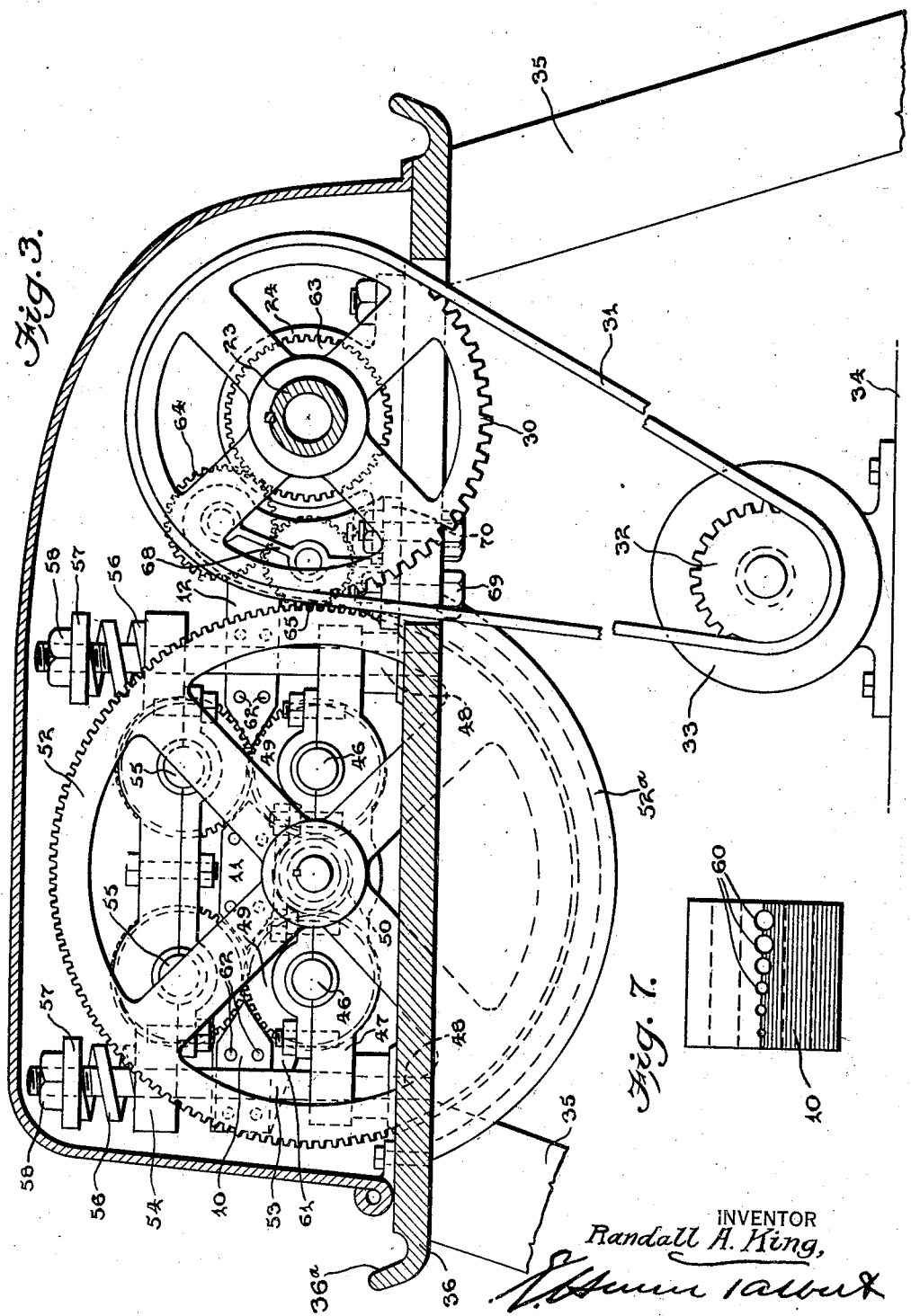

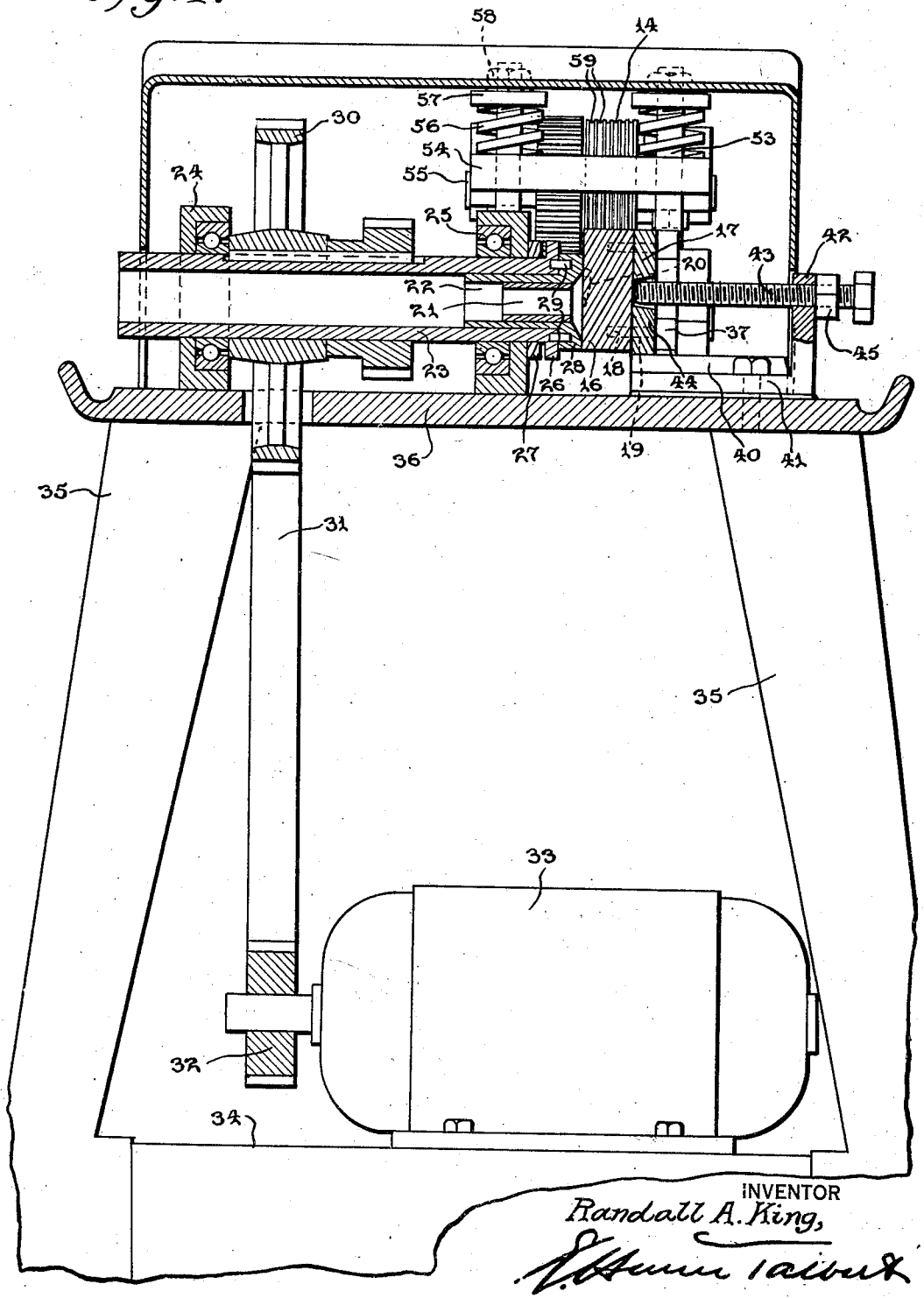

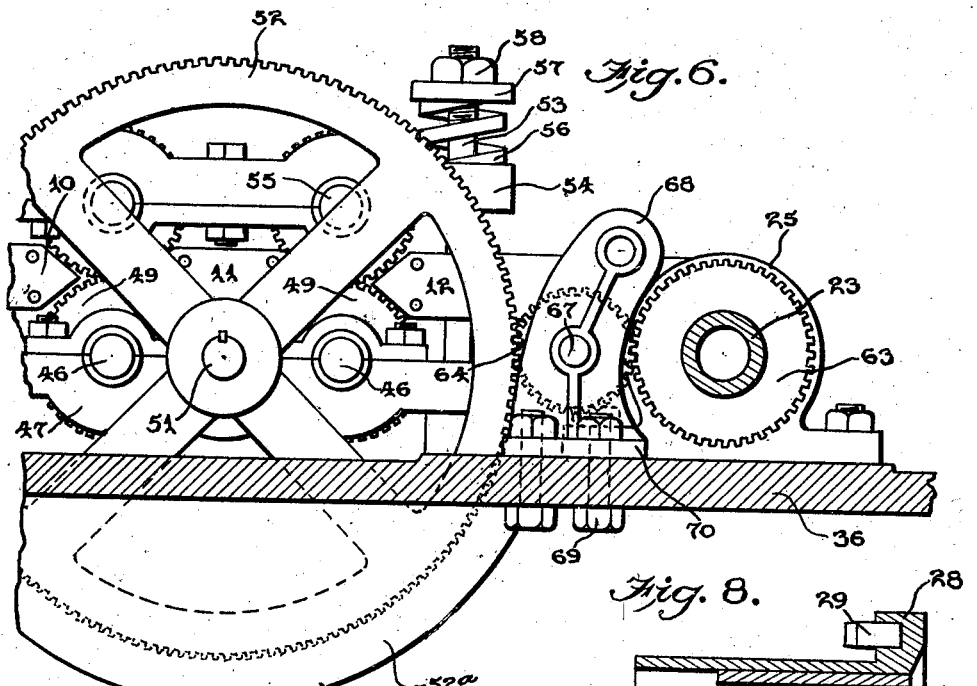
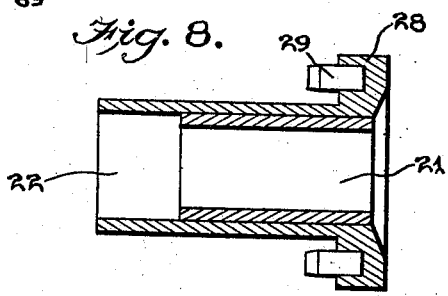
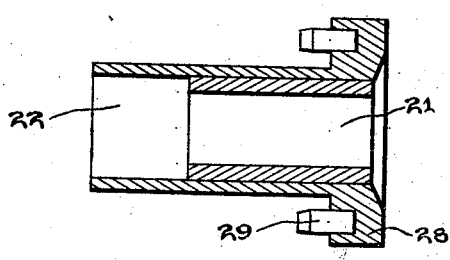
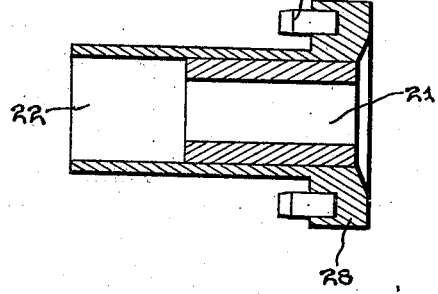
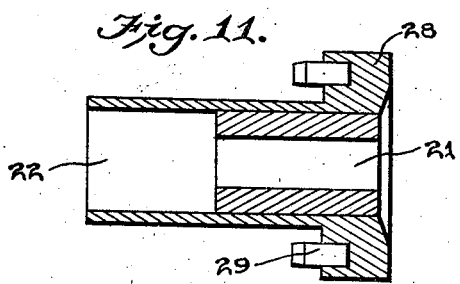

June 24, 1930.  R. A. KING  1,767,931
MACHINE FOR WINDING COIL SPRINGS
Filed June 22, 1929  6 Sheets-Sheet 6
Fig.13.  Fig.12.  Fig.15.  Fig.14.
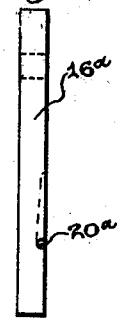 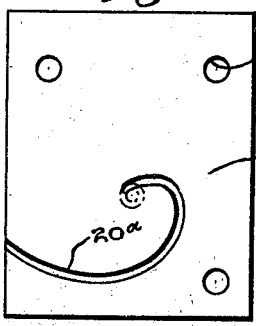 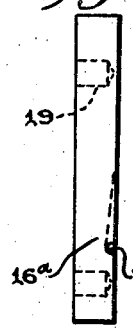 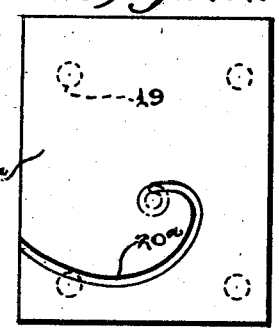
Fig.17.  Fig.16.  Fig.19.  Fig.18.
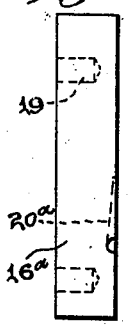 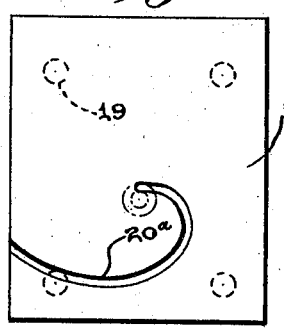  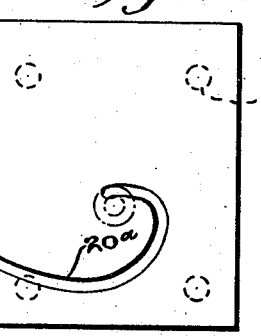
Fig.23.  Fig.22.  Fig.21.  Fig.20.
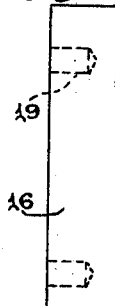 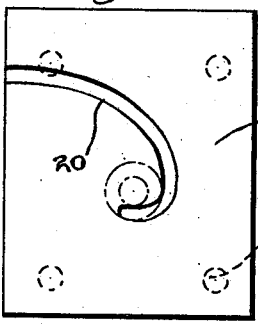 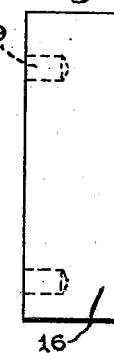 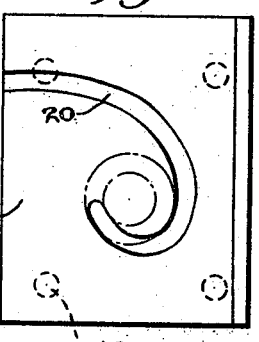
Fig.25.  Fig.24.
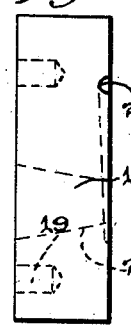 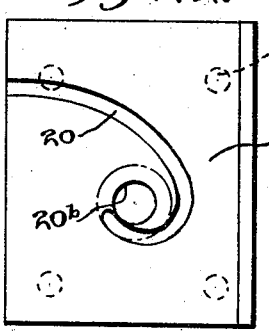
Inventor
Randall A. King,
By *[signature]*
Attorney Patented June 24, 1930

1,767,931

UNITED STATES PATENT OFFICE

RANDALL A. KING, OF PUEBLO, COLORADO

MACHINE FOR WINDING COIL SPRINGS

Application filed June 22, 1929. Serial No. 372,946.

The object of the invention is generally to provide a machine constructed so as to readily wind springs from various sizes of wire either in right-hand or left-hand spirals; to provide a construction in which the spring is formed in and advanced through a thimble, rather than on a spindle; to provide a winding machine equipped with a feeding section in which a constant and uniform tension is maintained on the wire; to provide a series of guides through which the wire is passed in the feeding section and between which it is subjected to the action of pressure rolls for maintaining the tension; to provide a machine of this nature equipped with a plurality of dies formed to carry each size of wire within the range of the machine and to direct it either into a right-hand or left-hand spiral, the dies being selectively mountable on the forming section of the machine; to provide a swinging plate on which the dies are mounted, so that they may be swung toward or from the coil receiving thimble; to provide a construction that provides for the relative reversal of rotation between the feeding and forming sections; and to provide a machine of this nature which is reduced to the simplest construction mechanically which makes for its cheap manufacture and low marketing cost.

With this object in view the invention consists in a construction and combination of parts of which a preferred embodiment is illustrated in the accompanying drawings, wherein:

Figure 1 is a plan view of the invention showing in section, the cover member of the working parts.

Figures 2 and 3 are sectional views on the plane indicated by the lines 2—2 and 3—3 respectively of Figure 1.

Figure 4 is a transverse sectional view on the plane indicated by the line 4—4 of Figure 1.

Figure 5 is a detail sectional view illustrating the die and adjacent wire guide, when the machine is arranged for the winding of right-hand springs.

Figure 6 is a detail view partly in section and partly in elevation showing the geared connections between the feeding and winding mechanism when the machine is arranged for the winding of right-hand springs.

Figure 7 is an end elevational view of one of the wire guides.

Figure 1:
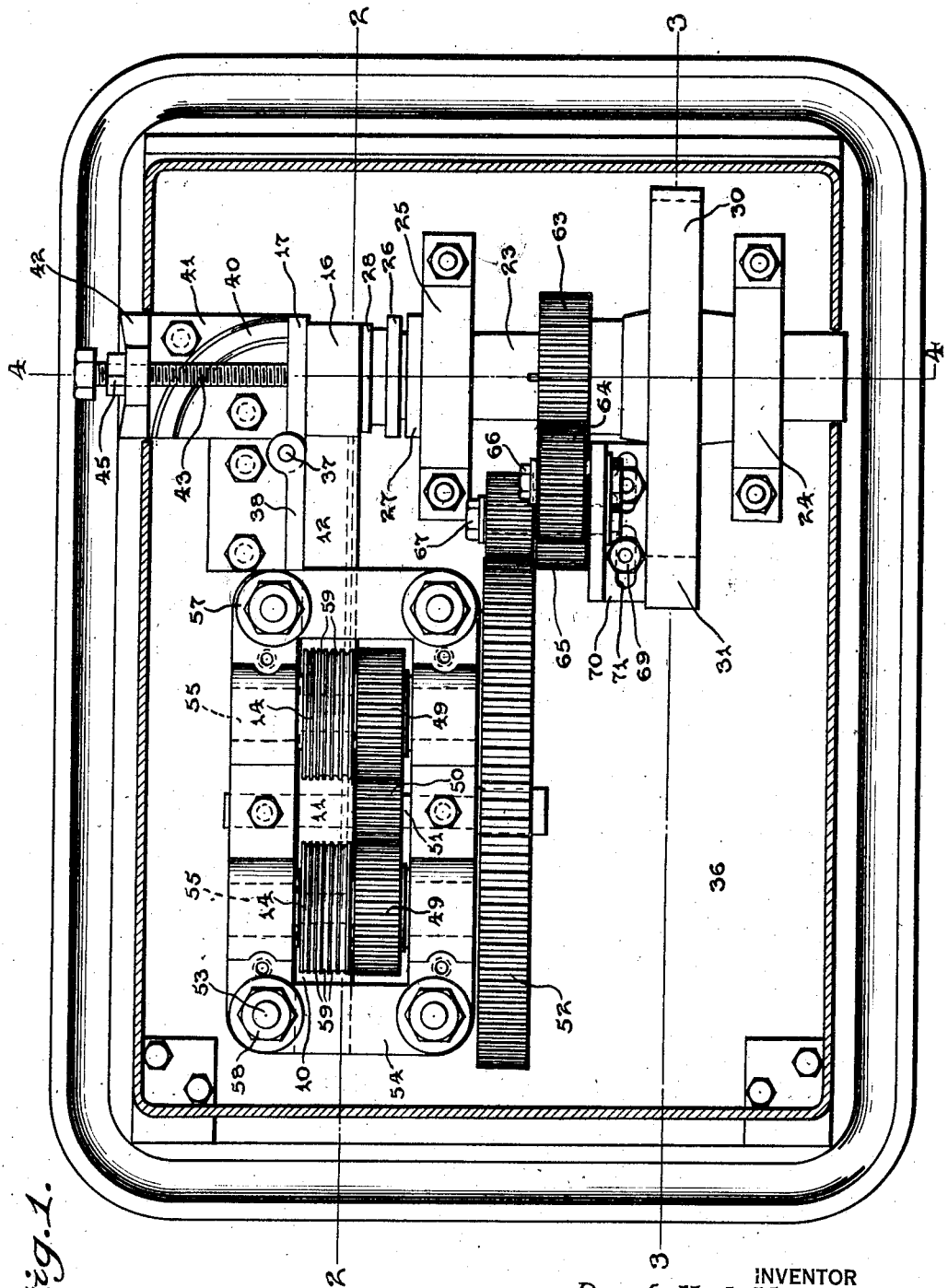

Figures 8 to 11 inclusive are longitudinal sectional views illustrating the spring receiving thimbles for various sizes of springs and diameters of wire.

Figures 12 to 19 inclusive illustrate in pairs the front and edge elevational views of the dies employed for right-hand springs of different sizes of wire.

Figures 20 to 25 illustrate in pairs the front and edge elevations of dies for left-hand springs of different sizes of wire.

In the production of coil springs with the machine herein disclosed, the wire strand is led from a coil carried on an appropriate support and advanced through the initial, intermediate and terminal guides 10, 11 and 12 between which it is subjected to the action of the pressure rollers 14 and 15, these rollers being arranged in pairs of which the upper pair are in peripheral contact with the lower pair. From the terminal guide, the wire passes to the die 16 which is removably mounted on the swinging die plate 17 from the face of which project pins 18 entering sockets 19 in the die. In the use of the machine, a separate die is employed for each size wire and that die used for a left-hand spring differs from the corresponding die for a right-hand spring in the location of its wire guide groove 20 which is of generally arcuate form terminating in the periphery of a circle whose outer diameter corresponds to the bore of the hardened bushing 21 which is inserted in and carried by the thimble 22, the thimble being mounted in the hollow spindle 23 rotatably mounted in the ball bearings 24 and 25. The spindle is flanged as indicated at 26 at the thimble receiving end and behind said flange is provided with a thrust bearing 27. The thimble is removably mounted in the spindle, being merely slid into the flange end thereof but in order that it may be positively driven by the spindle when the latter is rotated, the thimble is provided with a thrust flange 28 provided with dowels 29 which seat in sockets in the flange 26.

The spindle carries a gear 30 by means of which it is driven through the instrumentality of a silent chain belt 31 which is trained over a pinion 32 carried by the shaft of a reversible motor 33, the motor being mounted on a shelf 34 supported from the legs 35 by which the bed plate 36 is carried, the latter supporting the whole mechanism with the exception of the driving motor which is disposed below it.

The wire guide groove 20 is of progressively reduced depth from its intake to its discharge end, the discharge end being flush with the die where the wire enters the thimble and the intake end being of a depth equal to the diameter of the wire. The arcuate formation of the groove results, as the wire is forced through the latter, in the gradual bending of the wire until it begins a circular curve of the convolution of the spring to be formed, when the wire enters the thimble in which successive convolutions are forced.

The swinging die plate 17 has a hinge connection 37 with a bracket plate 38, the latter supporting the discharge end of the terminal guide 12. On its bottom and at the free edge it is formed with a bearing foot 39 traversing an arcuate rib 40 formed on the base plate 41 of the feed screw bracket 42. In the bracket 42 is carried a feed screw 43 slightly above axial alignment with the spindle 23 and this screw may be adjusted axially toward and away from the thimble end of the spindle. With the screw 43 adjusted to be out of obstructing relation with the die plate 17, the latter may be swung on its hinged connection from a position directly in front of the thimble end of the spindle to a position at right angles thereto, the latter position being such as will permit a change of dies and the former position that in which the feeding of the wire into the thimble takes place. The arcuate rib supports the free edge of the die plate throughout its swinging movement. In the feeding position of the die supporting plate, the screw 42 is advanced toward the thimble end of the spindle, when its terminal passes through the clearance opening 44 of the die plate, bearing upon the die to hold the latter close to the thimble resulting in forcing the wire into the thimble as it is forced through the forming groove of the die. The adjustment of the screw to properly position the die is maintained with a lock nut 45 carried on the screw and bearing against the outer face of the bracket 42.

In the feeding section of the machine, the rollers 15 are carried on shafts 46 mounted in bearings on a bed 47; the latter being spaced above but secured to the bed plate 36 by cap screws 48. The rollers 15 are rotated by gears 49 carried on the shafts 46 and meshing with the pinion 50 carried by a shaft 51 which is journalled on the bed 47 and which carries a gear 52 of relatively large diameter actuated from the spindle 23 in a manner hereinafter appearing. At the four corners of the bed 47 are disposed the posts 53 which serve to position a roller frame 54 by which the rollers 14 are carried, the latter having shafts 55 journalled in the roller frame. Since the wire being fed passes between the rollers 14 and 15 and since it is necessary for both rollers to make firm contact with the wire to ensure positive feeding action, the rollers 14 are forced towards the rollers 15 by spring pressure, each post 53 being provided with a compression spiral spring 56 surrounding the post and bearing upon the upper face of the roller frame 54, the posts being provided with inverted flanged washers 57, bearing upon the upper ends of the springs 56 and retained by nuts 58 threadingly engaged with the posts. The adjustment of the nuts serves, within limited range, to determine the pressure to be exerted by the springs.

The feed rollers 14 and 15 are each provided with a series of circumferential grooves 59, each groove corresponding to a particular size of wire, so that in the varying sizes within the range of the machine, each may be disposed in its appropriate groove in the feed roller. The three guides 10, 11 and 12 are provided with guide holes 60, these holes corresponding to the different sizes of wire to be used, the holes in the guides registering with the corresponding grooves in the feed rollers. The guides are formed with wedge-shaped ends adjacent the rollers to dispose the guide holes as far in between the rollers as possible.

The guides are carried on bracket plates 61 carried by the bed 47, these bracket plates having pins 62 entering holes formed on the sides of the guides.

The guide 12 is jointly supported by the bracket plate 61 and the bracket plate 38, a corresponding pin and hole support being employed in connection with the latter, and the guide holes at their discharge end register with the entrance ends of the guide grooves 20 in the dies, the die for a particular size wire being of such a thickness as to position its guide groove opposite the corresponding guide hole or opening in the guide 12.

Motion is communicated to the feed rollers 14 and 15 by the relatively large gear 52, as heretofore described and this receives its motion from the spindle 23 on which is carried a gear 63 meshing with an idler 64 which in turn meshes with a double idler 65 which in turn meshes with the gear 52. The idlers 64 and 65 are mounted on studs 66 and 67 and are removably supported on a bracket 68, the latter being secured to the bed plate 48 by bolts 69 and the foot or base 70 of the bracket being formed with slots 71 through which the bolts pass, so that the bracket may be adjusted to properly mesh the idlers with their respective gears. With the employment of the two idlers 64 and 65, the feed rollers and spindle turn in relatively opposite directions which must be the condition when left-hand springs are being wound. When right-hand springs are to be wound, the two idlers 64 and 65 are replaced with an equivalent of the latter which is then mounted on the stud 67 and adjusted to be in mesh both with the gears 52 and 63. With the one idler the feed rollers and spindle turn in the same direction, which is the condition when right-hand springs are being wound.

The idlers 64 and 65 are replaced with idlers of different ratios to vary the relative speeds of the spindle and feed rollers, since these relative speeds must be subject to change when working with different sizes of wire. In actual operation, the feed rollers must always turn in a direction to feed the wire from the guide 10 through the guide 12 which calls for left-handed rotation of the gear 52 which is its direction of rotation irrespective of whether right- or left-hand springs are being formed. The spindle, however, must rotate right-handedly or left-handedly, depending on the character of the spring, and its change of direction is effected by a reversal in the direction of rotation of the driving motor. The idler gears, therefore, provide for maintaining the desired left-handed rotation of the gear 52 irrespective of whether the spindle is rotated right-handedly or left-handedly, as well as means for changing the relative speeds of the spindle and feed rollers.

In the assembly views in the drawings, the machine is arranged for the winding of springs having their spirals turned left-handedly. Both the idler gears 64 and 65 are therefore employed and the motor is connected to rotate right-handedly with the point of sight considered at the pinion end of the motor. The spindle, therefore, rotates right-handedly and a left-hand forming die 16 is mounted on the die plate. The wire is passed through the guides 10, 11 and 12 and between the rollers 14 and 15, being positioned in the proper holes in the guides and grooves in the rollers according to its size. The gear 52 rotating left-handedly, the rollers 15 rotate right-handedly and the rollers 14 left-handedly and the wire is forced through the guides and into the forming groove 20 of the die by which the coil forming operation is started and then into the thimble 22, the successive coils being laid in the thimble and the completed spring passing through the same and out the remote end of the spindle. The complete equipment comprises a plurality of thimbles of which there is one for each size of wire.

If the springs to be formed are to be wound right-handedly, the driving motor is reversed to turn left-handedly, thus rotating the spindle 23 left-handedly, the idler gears 64 and 65 having been replaced with a single gear connecting the gears 63 and 52. The feed rollers thus rotate as before, so that the wire is fed in the same direction. The guide 12, however, is replaced with a guide 12$^a$, different from the guide 12 in that it is so shaped that its discharge end lies in a lower plane than that of the guide 12, which provides for the discharge of the wire into the forming groove 20$^a$ of a die 16$^a$ which has been mounted on the die plate. The forming groove 20$^a$ is similar to the forming groove 20 in the die 16 but arranged reversely to the latter, so that it forms a right-hand turn in forming the successive convolutions of the spring.

The equipment comprises a pair of right- and left-hand dies for each size of wire differing only in that their forming grooves are respectively reversely disposed and the several sets of dies vary in thickness so that, when mounted on the die plate, their forming grooves may register with the proper openings or holes in the guide 12.

In cases where it is desired to wind double springs where one is completely inclosed within the other, the smaller spring is first wound as described above. The larger or outer spring is then wound over it and in the second winding operation, a die such as that illustrated in Figures 24 and 25 is used. This die is formed with a taper hole 20$^b$ clear through it, the smaller end of the hole being of the diameter of the smaller or inner spring and the guide groove 20 terminating in the periphery of the smaller end of this hole. As the wire for the larger or outer spring is being coiled, the smaller spring is being fed through the hole 20$^b$, so that the outer spring is rolled upon it. The tapering shape of the hole 20$^b$ provides an enlarged entrance end for the spring coil being fed through it and the position of the feed screw above the center of the spindle permits it bearing upon the die adjacent the upper edge of the clearance opening 20$^b$. In the winding operation, the wire being operated upon undergoes a physical change. Great heat is generated due to the friction in the forming die and also to the friction in the spindle, but this condition provides for a tempering step by the use of oil which is continually splashed on the die and spindle during the spring forming operation. The oil is initially placed in the guard housing 52$^a$ on the under face of the bed plate 36 and the gear 52, rotating in this oil, splashes it in sufficient quantities on the spring forming parts, so that not only they are protected from damage due to the heat, but the spring is given an oil temper in forming. The channel 36$^a$ on the bed plate prevents the leakage of oil from the latter, so that it may be returned to the guard housing 52$^a$.

It will be noted that in the spring forming operation, the wire is never subjected to tensional strain nor to torsion, but always to a compressive strain so that there is a compacting rather than a separation of its molecular structure, as would be the case were it wound on the exterior of a spindle or arbor when a tensile strain would be present. The heat generated reduces the initial temper of the wire, but the oil gives it the proper temper in the coil forming operation and experience has shown that wire, which in the first instance was easily broken, was finally delivered by the machine in a formed spring of such tough and tenacious character as to successfully resist unusual torsional strains in the direction of or against its spirals and of such a resilient quality as to provide for the resumption of normal shape after unusual bends.

By reason of the manner in which it is wound, the material of the strand constituting the formed spring is subjected to compression on that part which constitutes the interior of the completed spring, with none, or but slight compression of the material at the outer surface of the finished spring.

The invention having been described what is claimed as new and useful is:

1. A coil spring forming machine comprising a spring receiving spindle, wire feeding means for advancing spring wire towards the spindle, and a die swingingly mounted in front of the spindle and provided with a forming groove in communication at one end with the feeding means and at the other end with the spindle.

2. A coil spring forming machine comprising a spring receiving spindle, wire feeding means for advancing spring wire towards the spindle, and a die positioned in front of the spindle and provided with a forming groove in communication at one end with the feeding means and at the other end with the spindle, the die being movable toward and away from the receiving end of the spindle.

3. A coil spring forming machine comprising a spring receiving spindle, wire feeding means for advancing spring wire towards the spindle, and a die positioned in front of the spindle and provided with a forming groove in communication at one end with the feeding means and at the other end with the spindle, the die being movable toward and away from the receiving end of the spindle, and means for holding the die in contact with the receiving end of the spindle.

4. A coil spring forming machine comprising a spring receiving spindle, wire feeding means for advancing spring wire towards the spindle, and a die positioned in front of the spindle and provided with a forming groove in communication at one end with the feeding means and at the other end with the spindle, the die being movable toward and away from the receiving end of the spindle, and adjustable means for holding the die in contact with the receiving end of the spindle.

5. A coil spring forming machine comprising a spring receiving spindle, wire feeding means for advancing spring wire towards the spindle, means for rotating the spindle in either direction, die holding means, and dies for selective mounting on said die holding means and respectively provided with reversely disposed coil forming grooves of which one end is in communication with the feeding means and the other end in communication with the spindle.

6. A coil spring forming machine comprising a spring receiving spindle, wire feeding means for advancing spring wire towards the spindle, means for rotating the spindle in either direction, die holding means, and dies for selective mounting on said die holding means and respectively provided with reversely disposed coil forming grooves of which one end is in communication with the feeding means and the other end in communication with the spindle, the die holding means consisting of a plate movable toward and away from the receiving end of the spindle.

7. A coil spring forming machine comprising a spring receiving spindle, wire feeding means for advancing spring wire towards the spindle, means for rotating the spindle in either direction, die holding means, and dies for selective mounting on said die holding means and respectively provided with reversely disposed coil forming grooves of which one end is in communication with the feeding means and the other end in communication with the spindle, the die holding means consisting of a plate movable toward and away from the receiving end of the spindle, said plate having a hinge mounting to one side of the spindle, and a pressure screw axially aligned with the spindle and passing through an opening in the plate to bear upon the die and hold it in contact with the spindle.

8. A coil spring forming machine comprising a spring receiving spindle, means for selectively rotating the spindle in either direction, wire feeding means operatively connected with the spindle for advancing spring wire towards the same irrespective of the direction of rotation of the spindle, die mounting means, and dies provided respectively with reversely disposed coil forming grooves, said dies being selectively attachable to said mounting when the grooves are in communication at one end with the feeding means and at the other end with the spindle.

9. A coil spring forming machine comprising a spring receiving spindle, means for selectively rotating the spindle in either direction, wire feeding means operatively connected with the spindle for advancing spring wire towards the same irrespective of the direction of rotation of the spindle, die mounting means, and dies provided respectively with reversely disposed coil forming grooves, said dies being selectively attachable to said mounting when their grooves are in communication at one end with the feeding means and at the other end with the spindle, the receiving end of the spindle being provided with a coil receiving thimble.

10. A coil spring forming machine comprising a spring receiving spindle, means for selectively rotating the spindle in either direction, wire feeding means operatively connected with the spindle for advancing spring wire towards the same irrespective of the direction of rotation of the spindle, die mounting means, and dies provided respectively with reversely disposed coil forming grooves, said dies being selectively attachable to said mounting when their grooves are in communication at one end with the feeding means and at the other end with the spindle, the receiving end of the spindle being provided with a coil receiving thimble, and the die mounting means consisting of a plate having a hinge mounting to one side of the spindle to permit it being swung toward and away from the spindle for change of dies.

11. A coil spring forming machine comprising a spring receiving spindle, means for selectively rotating the spindle in either direction, wire feeding means operatively connected with the spindle for advancing spring wire towards the same irrespective of the direction of rotation of the spindle, die mounting means, and dies provided respectively with reversely disposed coil forming grooves, said dies being selectively attachable to said mounting when their grooves are in communication at one end with the feeding means and at the other end with the spindle, the receiving end of the spindle being provided with a coil receiving thimble, and the die mounting means consisting of a plate having a hinge mounting to one side of the spindle to permit its being swung toward and away from the spindle for change of dies, and means for holding the die in contact with the thimble in one position of the die holding plate.

12. A coil spring forming machine comprising a spring receiving spindle, means for selectively rotating the spindle in either direction, wire feeding means operatively connected with the spindle for advancing spring wire towards the same irrespective of the direction of rotation of the spindle, die mounting means, and dies provided respectively with reversely disposed coil forming grooves, said dies being selectively attachable to said mounting when their grooves are in communication at one end with the feeding means and at the other end with the spindle, the receiving end of the spindle being provided with a coil receiving thimble, and the die mounting means consisting of a plate having a hinge mounting to one side of the spindle to permit it being swung toward and away from the spindle for change of dies, and means for holding the die in contact with the thimble in one position of the die holding plate, said means comprising an adjusting screw axially aligned with the spindle and passing through a clearance opening in the holding plate to bear upon the die.

13. A coil spring forming machine comprising a spring receiving spindle, means for selectively rotating the spindle in either direction, wire feeding means operatively connected with the spindle for advancing spring wire towards the same irrespective of the direction of rotation of the spindle, die mounting means, and dies provided respectively with reversely disposed coil forming grooves, said dies being selectively attachable to said mounting when their grooves are in communication at one end with the feeding means and at the other end with the spindle, the receiving end of the spindle being provided with a coil receiving thimble, and the die mounting means consisting of a plate having a hinge mounting at one side of the spindle to permit it being swung toward and away from the spindle for change of dies, and means for holding the die in contact with the thimble in one position of the die holding plate, said means comprising an adjusting screw axially aligned with the spindle and passing through a clearance opening in the holding plate to bear upon the die, and a bracket with which said screw is threadingly engaged, the bracket being formed with a base plate and an arcuate rib concentric with the hinge mounting of the holding plate, the latter having a foot bearing on the upper face of said rib.

14. A coil spring forming machine comprising a spring receiving spindle, wire feeding means for advancing spring wire towards the spindle and comprising spaced stationary wire guides and intervening feed rollers, and a die positioned in front of the spindle and provided with a forming groove in communication at one end with the spindle and at the other end with the terminal stationary guide of the feeding means.

15. A coil spring forming machine comprising a spring receiving spindle, wire feeding means for advancing spring wire towards the spindle and comprising spaced stationary wire guides and intervening feed rollers, and a die positioned in front of the spindle and provided with a forming groove in communication at one end with the spindle and at the other end with the terminal stationary guide of the feeding means, the feeding rollers being arranged in pairs of which one pair is above and the other below the stationary guides.

16. A coil spring forming machine comprising a spring receiving spindle, wire feeding means for advancing spring wire towards the spindle and comprising spaced stationary wire guides and intervening feed rollers, and a die positioned in front of the spindle and provided with a forming groove in communication at one end with the spindle and at the other end with the terminal stationary guide of the feeding means, the feed rollers being arranged in pairs of which one pair is above and the other below the stationary guides, one pair of said rollers being yieldingly impelled toward the other pair.

17. A coil spring forming machine comprising a spring receiving spindle, wire feeding means for advancing spring wire towards the spindle and comprising spaced stationary wire guides and intervening feed rollers, and a die positioned in front of the spindle and provided with a forming groove in communication at one end with the spindle and at the other end with the terminal stationary guide of the feeding means, the feeding rollers being arranged in pairs of which one pair is above and the other below the stationary guides, the upper pair of said rollers being spring impelled toward the other pair and provided with means for adjusting the pressure of said springs.

18. A coil spring forming machine comprising a spring receiving spindle, wire feeding means for advancing spring wire towards the spindle and comprising spaced stationary wire guides and intervening feed rollers, and a die positioned in front of the spindle and provided with a forming groove in communication at one end with the spindle and at the other end with the terminal stationary guide of the feeding means, the feeding rollers being arranged in pairs of which one pair is above and the other below the stationary guides, said stationary guides being provided with pluralities of holes corresponding to different sizes of wire and the feed rollers being formed with peripheral grooves of corresponding sizes to and in registration with the holes in the guides, the die having its forming groove corresponding in size to one of the holes in said stationary guides.

19. A coil spring forming machine comprising a spring receiving spindle, wire feeding means for advancing spring wire towards the spindle and comprising spaced stationary wire guides and intervening feed rollers, and a die positioned in front of the spindle and provided with a forming groove in communication at one end with the spindle and at the other end with the terminal stationary guide of the feeding means, the feeding rollers being arranged in pairs of which one pair is above and the other below the stationary guides, said stationary guides being provided with pluralities of holes corresponding to different sizes of wire and the feed rollers being formed with peripheral grooves of corresponding sizes to and in registration with the holes in the guides, the die having its forming groove corresponding in size to one of the holes in said stationary guides, the said rollers and spindle being operatively connected for synchronous movement.

20. A coil spring forming machine comprising a spring receiving spindle, die holding means mounted in front of said spindle, a plurality of dies selectively mountable in said die holding means and each provided with a forming groove in communication at one end with the spindle, the forming grooves in different dies being of different sizes with those in some reversely disposed with respect to those in the others, wire feeding means for advancing spring wire towards the spindle and comprising spaced stationary guides with guide holes corresponding in size to the grooves in the different dies, the guide holes in the terminal guide communicating with the forming grooves in the respective dies, feed rollers arranged in pairs respectively above and below the stationary guides and disposed between adjacent guides, and operative connections between the spindle and feed rollers to permit continuous rotation of the latter in one direction and rotation of the former in either direction.

In testimony whereof he affixes his signature.

RANDALL A. KING.